US007149188B2

(12) United States Patent
Wilson

(10) Patent No.: US 7,149,188 B2
(45) Date of Patent: Dec. 12, 2006

(54) DISTRIBUTED PROCESSING FOR OPTIMAL QOS IN A BROADBAND ACCESS SYSTEM

(75) Inventor: Eric K. Wilson, Cupertino, CA (US)

(73) Assignee: Vyyo, Inc., Norcross, GA (US)

( * ) Notice: Subject to any disclaimer, the term of this patent is extended or adjusted under 35 U.S.C. 154(b) by 1080 days.

(21) Appl. No.: 09/771,225

(22) Filed: Jan. 26, 2001

(65) Prior Publication Data

US 2002/0056132 A1 May 9, 2002

Related U.S. Application Data

(60) Provisional application No. 60/178,030, filed on Jan. 26, 2000.

(51) Int. Cl.
*G06F 11/00* (2006.01)
*G01R 31/08* (2006.01)
*G08C 15/00* (2006.01)
*H04J 3/14* (2006.01)
*H04J 3/16* (2006.01)
*H04J 3/22* (2006.01)
*H04L 12/26* (2006.01)

(52) U.S. Cl. .................. 370/235; 370/252; 370/465

(58) Field of Classification Search ............. 370/252, 370/431, 464–465, 468, 235, 241
See application file for complete search history.

(56) References Cited

U.S. PATENT DOCUMENTS

| 4,010,465 | A | | 3/1977 | Dodington et al. |
| 4,099,121 | A | | 7/1978 | Fang |
| 4,385,384 | A | | 5/1983 | Rosbury et al. |
| 4,777,595 | A | * | 10/1988 | Strecker et al. ............. 709/236 |
| 5,052,024 | A | | 9/1991 | Moran, III et al. |
| 5,272,700 | A | | 12/1993 | Hansen et al. |

(Continued)

FOREIGN PATENT DOCUMENTS

CA 2187141 4/1998

(Continued)

OTHER PUBLICATIONS

Golestani, S. (1995) "Network Delay Analysis of a Class of Fair Queueing Algorithms", *IEEE Journal on Selected Areas in Communication* 13(6):1057-1070.

(Continued)

*Primary Examiner*—Kevin C. Harper
(74) *Attorney, Agent, or Firm*—John W. Carpenter; Reed Smith, LLP

(57) ABSTRACT

A method for distributing the QOS processing in a broadband access system to the system modems and the head-end equipment. Requests for a change in the operating parameters are transmitted on an exception basis, thereby greatly reducing the amount of system over-head required. In the upstream, the Cable Modem Termination System (CMTS) or Wireless Modem Termination System (WMTS or Wireless Hub) determines a signal-to-noise ratio (SNR) or Bit Error Rate (BER) (or similar measurable parameter) quality data for each received packet. If a measured parameter is outside of the predetermined limits, then the WMTS reports to the NMS (Network Management Operating System) the modem ID and the measured data of the particular packet. The NMS may then modify the operating parameters. In the downstream, each modem determines an SNR or BER (or some other measurable parameter) measurement for the incoming packets. These values may be compared to some boundary conditions. If the system is performing outside the boundary conditions, the modem sends an exception message to the NMS which reassigns the modem to a different downstream channel or modifies the channel parameters.

24 Claims, 4 Drawing Sheets

U.S. PATENT DOCUMENTS

| | | | |
|---|---|---|---|
| 5,311,550 A | 5/1994 | Fouche et al. | |
| 5,377,035 A | 12/1994 | Wang et al. | |
| 5,408,349 A | 4/1995 | Tsushima et al. | |
| 5,471,645 A | 11/1995 | Felix | |
| 5,481,542 A | 1/1996 | Logston et al. | |
| 5,481,561 A | 1/1996 | Fang | |
| 5,487,099 A | 1/1996 | Maekawa | |
| 5,510,859 A | 4/1996 | Douglass et al. | |
| 5,557,612 A | 9/1996 | Bingham | |
| 5,590,409 A | 12/1996 | Sawahashi et al. | |
| 5,596,604 A | 1/1997 | Cioffi et al. | |
| 5,606,664 A | 2/1997 | Brown et al. | |
| 5,625,874 A | 4/1997 | Uchida et al. | |
| 5,634,206 A | 5/1997 | Reed et al. | |
| 5,666,646 A | 9/1997 | McCollum et al. | |
| 5,724,385 A | 3/1998 | Levin et al. | |
| 5,734,589 A | 3/1998 | Kostreski et al. | |
| 5,740,525 A | 4/1998 | Spears | |
| 5,752,161 A | 5/1998 | Jantti et al. | |
| 5,796,783 A | 8/1998 | Crawford | |
| 5,809,090 A | 9/1998 | Buternowsky et al. | |
| 5,809,406 A | 9/1998 | Taki et al. | |
| 5,809,427 A | 9/1998 | Perreault et al. | |
| 5,818,825 A | 10/1998 | Corrigan et al. | |
| 5,831,690 A | 11/1998 | Lyons et al. | |
| 5,862,451 A | 1/1999 | Grau et al. | |
| 5,867,528 A | 2/1999 | Verbueken | |
| 5,896,414 A | 4/1999 | Meyer et al. | |
| 5,903,558 A | 5/1999 | Jones et al. | |
| 5,909,384 A | 6/1999 | Tal et al. | |
| 5,920,571 A * | 7/1999 | Houck et al. | 370/458 |
| 5,937,005 A | 8/1999 | Obuchi et al. | |
| 5,940,743 A | 8/1999 | Sunay et al. | |
| 5,963,843 A | 10/1999 | Sit et al. | |
| 5,963,870 A | 10/1999 | Chheda et al. | |
| 5,974,106 A | 10/1999 | Dupont | |
| 5,978,855 A | 11/1999 | Metz et al. | |
| 5,991,286 A | 11/1999 | Labonte et al. | |
| 6,009,310 A | 12/1999 | Motohashi | |
| 6,035,008 A | 3/2000 | Kim | |
| 6,052,408 A | 4/2000 | Trompower et al. | |
| 6,072,839 A | 6/2000 | Mondal et al. | |
| 6,075,787 A | 6/2000 | Bobeck et al. | |
| 6,111,887 A | 8/2000 | Daily et al. | |
| 6,112,232 A | 8/2000 | Shahar et al. | |
| 6,128,588 A | 10/2000 | Chacon | |
| 6,140,911 A | 10/2000 | Fisher et al. | |
| 6,141,356 A | 10/2000 | Gorman | |
| 6,157,311 A | 12/2000 | Berkovich | |
| 6,160,447 A | 12/2000 | Huang | |
| 6,169,728 B1 * | 1/2001 | Perreault et al. | 370/235 |
| 6,172,970 B1 | 1/2001 | Ling et al. | |
| 6,185,227 B1 | 2/2001 | Sipola | |
| 6,195,697 B1 | 2/2001 | Bowman-Amuah | |
| 6,650,624 B1 * | 11/2003 | Quigley et al. | 370/252 |
| 6,714,551 B1 * | 3/2004 | Le-Ngoc | 370/401 |
| 2004/0160901 A1 * | 8/2004 | Raith | 370/252 |

FOREIGN PATENT DOCUMENTS

| | | |
|---|---|---|
| EP | 0021 544 A1 | 1/1981 |
| EP | 0025 767 A1 | 3/1981 |

OTHER PUBLICATIONS

Stiliadis, D. et al. (1998) "Rate-Proportional Servers: A Design Methodology for Fair Queueing Algorithms", *IEEE/ACM Transactions of Networking* 6(2):164-174.

Stiliadis, D. et al. (1998) "Efficient Fair Queuing Algorithms for Packet-Switched Networks", *IEEE/ACM Transactions of Networking* 6(2):175-185.

Data Over Cable Interface Specifications, Cable Modem Termination System-Network Side Interface Specification, SP-CMTS-NSII01-960702 (Jul. 2, 1996) pp. i-13.

Data-Over-Cable Service Interface Specifications, Cable Modem to Customer Premise Equipment Interface Specification. SP-CMC1-102-980317 (Mar. 17, 1998) pp. i-40.

Data-Over-Cable Service Interface Specifications, Radio Frequency Interface Specification, SP-RFI-I04-980724 (Jul. 24, 1998) pp. i-196.

Data-Over-Cable Service Interface Specifications, Operations Support System Interface Specification SP-OSSI-102-990113 (Jan. 13, 1999) pp. i-14.

Data-Over-Cable Service Interface Specifications, Operations Support System Interface Specification Radio Frequency Interface, SP-OSSI-RFI-103-990113 (Jan. 13, 1999) pp. i-29.

Data-Over-Cable Service Interface Specifications, Baseline Privacy Interface Specification, SP-BPI-102-990319 (Mar. 19, 1999) pp. i-88.

Data-Over-Cable Service Interface Specifications, Baseline Privacy Interface Specification, SP-BPI-102-990731 (Jul. 31, 1999) pp. i-160.

Data-Over-Cable Service Interface Specifications, Radio Frequency Interface Specification, SP-RFIv1.1-I03-991105 (Nov. 5, 1999) pp. i-366.

Data-Over-Cable Service Interface Specifications, Operations Support System Interface Specification SP-OSSIv1.1-D01-991115 (Nov. 15, 1999) pp. i-81.

Data-Over-Cable Service Interface Specifications, Operations Support System Interface Specification SP-OSSIv1.1-103-001220 (Dec. 20, 2000) p. ii.

* cited by examiner

| | | | 1 | 2 | 3 | 4 | 5 | 6 | 7 | 8 | 9 | 10 | | |
|---|---|---|---|---|---|---|---|---|---|---|---|---|---|---|
| | RF Band Top | MHz | 2154.60 | 2150.30 | 2150.70 | 2151.50 | 2153.10 | 2154.70 | 2155.50 | 2155.90 | 2157.40 | 2157.80 | = RF Freq + (Bandwidth/2) | |
| | RF Band Bottom | MHz | 2151.40 | 2150.10 | 2150.30 | 2150.70 | 2151.50 | 2153.10 | 2154.70 | 2155.50 | 2156.60 | 2157.40 | = RF Freq − (Bandwidth/2) | |
| | WMTS Input Frequency | MHz | 53.00 | 50.20 | 50.50 | 51.10 | 52.30 | 53.90 | 55.10 | 55.70 | 57.00 | 57.60 | = RF Freq − Upstream LO | |
| | WMU Output Frequency | MHz | 17.375 | 14.575 | 14.875 | 15.475 | 16.675 | 18.275 | 19.475 | 20.075 | 21.375 | 21.975 | = RF Freq − transverter offs | |
| | Data Rate | BpS | 5120 | 640 | 1280 | 2560 | 2560 | 5120 | 1280 | 640 | 1280 | 640 | | if QPSK=2*symbol / if 16QAM=4*symbol |
| | Symbol Rate | KHz | 2560 | 160 | 320 | 640 | 1280 | 1280 | 640 | 320 | 640 | 320 | = bandwidth/1.25 | |
| | FEC Factor | | b | c | c | a | a | b | b | a | c | b | | |
| | Transverter Offset | MHz | 2135.625 | 2135.625 | 2135.625 | 2135.625 | 2135.625 | 2135.625 | 2135.625 | 2135.625 | 2135.625 | 2135.625 | | |
| | Upstream Downconverter LO | MHz | 2100 | 2100 | 2100 | 2100 | 2100 | 2100 | 2100 | 2100 | 2100 | 2100 | | |
| | Modulation Type | | QPSK | 16QAM | QPSK | 16QAM | QPSK | 16QAM | QPSK | QPSK | QPSK | QPSK | select | |
| | Channel Bandwidth | KHz | 3200 | 200 | 400 | 800 | 1600 | 1600 | 800 | 400 | 800 | 400 | select | |
| Upstream Summary Table / Table: DocsIFUpstreamChannelTable | RF Frequency | MHz | 2153.00 | 2150.20 | 2150.50 | 2151.10 | 2152.30 | 2153.90 | 2155.10 | 2155.70 | 2157.00 | 2157.60 | Bold are operators inputs | A modem's profile is made up of its Downstream and Upstream IfIndexes / FEC factor is the type of FEC used for that profile |
| | Sector | | A | B | B | B | B | B | B | B | E | D | | |
| | Card Port | | A | A | B | C | D | E | F | A | A | A | | |
| | Slot | | 1 | 2 | 2 | 2 | 2 | 2 | 2 | 3 | 4 | 5 | | |
| | WMTS ID | | A | A | A | A | A | A | A | A | A | A | | |
| | IfIndex | | 1 | 2 | 3 | 4 | 5 | 6 | 7 | 8 | 9 | 10 | | |

Bandwidth/modulation tradeoffs

| Downstream | assume 64AQM and 6 MHz as reference | | | |
|---|---|---|---|---|
| | required S/N for 10^-6 | 27 | 21.5 | 13.5 |
| | Modulation | 64 QAM | 16 QAM | QPSK |
| | Bandwidth | | | |
| | 6000 | 0.0 | 5.5 | 13.5 |
| | 2000 | 4.8 | 10.3 | 18.3 |
| | 1000 | 7.8 | 13.3 | 21.3 |
| Up Stream | assume 16 QAM and 2 MHz as reference | | | |
| | required S/N for 10^-6 | | 21.5 | 13.5 |
| | Modulation | | 16 QAM | QPSK |
| | Bandwidth | | | |
| | 3200 | | 0.0 | 8.0 |
| | 1600 | | 3.0 | 11.0 |
| | 800 | | 6.0 | 14.0 |
| | 400 | | 9.0 | 17.0 |
| | 200 | | 12.0 | 20.0 |

| IfIndex | 1 | 2 | 3 | 4 | 5 | 6 | 7 | 8 | 9 | 10 | | |
|---|---|---|---|---|---|---|---|---|---|---|---|---|
| WMTS ID | A | A | A | A | A | A | A | A | A | A | | |
| Slot | 1 | 2 | 2 | 2 | 2 | 2 | 2 | 3 | 4 | 5 | | |
| Card Port | A | B | A | A | B | C | D | E | F | A | | |
| Sector | A | A | B | C | C | C | C | C | C | D | | |
| RF Frequency | MHz 2509.00 | 2513.00 | 2509.00 | 2518.50 | 2519.50 | 2520.50 | 2521.50 | 2522.50 | 2523.50 | 2521.00 | | |
| Channel Bandwidth | KHz 6000 | 2000 | 6000 | 1000 | 1000 | 1000 | 1000 | 1000 | 1000 | 6000 | select | |
| Modulation Type | 64QAM | 16QAM | 64QAM | QPSK | QPSK | QPSK | QPSK | QPSK | QPSK | QPSK | select | |
| Transmitter LO | MHz 2465 | 2471 | 2465 | 2477 | 2477 | 2477 | 2477 | 2477 | 2477 | 2477 | | |
| Transverter LO | MHz 2278 | 2278 | 2278 | 2278 | 2278 | 2278 | 2278 | 2278 | 2278 | 2278 | | |
| FEC Factor | a | c | c | b | b | b | b | a | c | b | | |
| Symbol Rate | KHz 5000 | 1667 | 5000 | 833 | 833 | 833 | 833 | 833 | 833 | 5000 | = bandwidth/1.25 | |
| Data Rate | BpS 30000 | 6667 | 30000 | 1667 | 1667 | 1667 | 1667 | 1667 | 1667 | 10000 | | if QPSK=2*symbol / if 16QAM=4*symbol / if 64QAM=6*symbol / if 256QAM=8*symbol |
| WMU Input Frequency | MHz 231.00 | 235.00 | 231.00 | 240.50 | 241.50 | 242.50 | 243.50 | 244.50 | 245.50 | 243.00 | = RF Freq - WMU LO | |
| WMTS Output Frequency | MHz 44.00 | 42.00 | 44.00 | 41.50 | 42.50 | 43.50 | 44.50 | 45.50 | 46.50 | 44.00 | = RF Freq - WMTS LO | |
| RF Band Bottom | MHz 2506.00 | 2512.00 | 2506.00 | 2518.00 | 2519.00 | 2520.00 | 2521.00 | 2522.00 | 2523.00 | 2518.00 | = RF Freq - (Bandwidth/2) | |
| RF Band Top | MHz 2512.00 | 2514.00 | 2512.00 | 2519.00 | 2520.00 | 2521.00 | 2522.00 | 2523.00 | 2524.00 | 2524.00 | = RF Freq + (Bandwidth/2) | |

A modem's profile is made up of its Downstream and Upstream IfIndexes

FIG. 3

DISTRIBUTED PROCESSING FOR OPTIMAL QOS IN A BROADBAND ACCESS SYSTEM

CROSS-REFERENCE TO RELATED APPLICATIONS

This application claims priority from U.S. Provisional Patent Application entitled DISTRIBUTED PROCESSING FOR OPTIMAL QOS IN A BROADBAND ACCESS SYSTEM, filed Jan. 26, 2000, Application Ser. No. 60/178,030; this application is related to the co-pending and commonly assigned U.S. Patent Application entitled GRAPHICAL INTERFACE FOR MANAGEMENT OF A BROADBAND ACCESS NETWORK, filed Jan. 26, 2001, Application Ser. No. 09/771,017; the entirety of both applications are herein incorporated by reference.

BACKGROUND OF THE INVENTION

1. Field of the Invention

The present invention relates generally to the field of data communications, and more particularly to a method and apparatus for distributed processing for optimal quality of service (QOS) in a broadband access system.

2. Description of the Related Art

In broadband access systems such as cable modem systems, particularly wireless ones, the overall system environment is dynamic. For example, modems may come-on-line or drop-off as users log-on or log-off the system. Furthermore, extensions and taps may be added to the CATV cable system. In wireless systems, multi-path and fading cause changes in the operating environment, as do changes in temperature and even the time of year. Also, various other conditions are outside the control of the system operator. In addition, system capabilities may be added and dropped from the base station at any time.

All of these system variations require a system operator to constantly monitor and update the system parameters, in order to provide for optimal operational efficiency and data throughput. Since this is a complex and highly interactive process, system changes are generally done infrequently. In fact, most system operators currently set a minimum data rate in a channel to prevent any problems under the worse possible conditions. This results in poorer data rates than might otherwise be possible. For example, many wireless systems are capable of operating at 64 QAM with a 5 megasymbol rate, but this operating environment requires a very good signal-to-noise ratio (SNR), and virtually no multi-path. Thus, in practice, system operators set the operating conditions to 16 QAM or QPSK, or to a slower symbol rate, in order to ensure the system will function even under various anomalous conditions. This results in a less than optimal system operating condition.

System performance could be improved if the system parameters were frequently adjusted to take advantage of the changing conditions. The process of monitoring an access system could be automated, but an automatic system would require a large and complex operating algorithm to determine what changes could be made, and how best to make those changes for each modem in the system. This process becomes exponentially more difficult as more modems are added on-line. Polling the modems for the quality of their received downstream signal also increases the traffic on the network and thereby reduces the net data throughput.

Thus, it would be desirable to be able to control the quality of service in a broadband access system, without requiring the manual adjustment of the system operational parameters and without significantly increasing the system over-head.

SUMMARY OF THE INVENTION

In general, the present invention distributes the QOS processing to the system modems and the head-end equipment. Requests for a change in the operating parameters are transmitted on an exception basis, thereby greatly reducing the amount of system over-head required. In the upstream, the Cable Modem Termination System (CMTS) or Wireless Modem Termination System (WMTS or Wireless Hub) determines a signal-to-noise ratio (SNR) or Bit Error Rate (BER) (or similar measurable parameter) quality data for each received packet.

If a measured parameter is outside of the predetermined lower limit, then the WMTS reports to the NMS (Network Management Operating System) the modem ID and the measured data of the particular packet. The NMS may then reassign the modem to a different downstream channel, which has a different operating frequency (useful for fading problems), a lower order modulation type (useful for SNR or multi-path problems), a lower symbol rate (useful for inter-symbol interference), implement a more robust FEC scheme, or some combination of these modifications.

In the downstream, each modem determines an SNR or BER (or some other measurable parameter) measurement for the incoming packets. These values may be compared to some boundary conditions (i.e. some predefined hysteresis window), which may be stored in a table. If the system is performing outside the boundary conditions, the modem sends an exception message to the NMS which reassigns the modem to a different downstream channel or modifies the channel parameters.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a summary table showing various modulation types and symbol rates for different upstream channels in a wireless modem system;

FIG. 2 is a table showing various bandwidth/modulation trade-offs;

FIG. 3 is a summary table showing various modulation types and symbol rates for different downstream channels in a wireless modem system;

DETAILED DESCRIPTION OF THE INVENTION

Figures 4, 5:
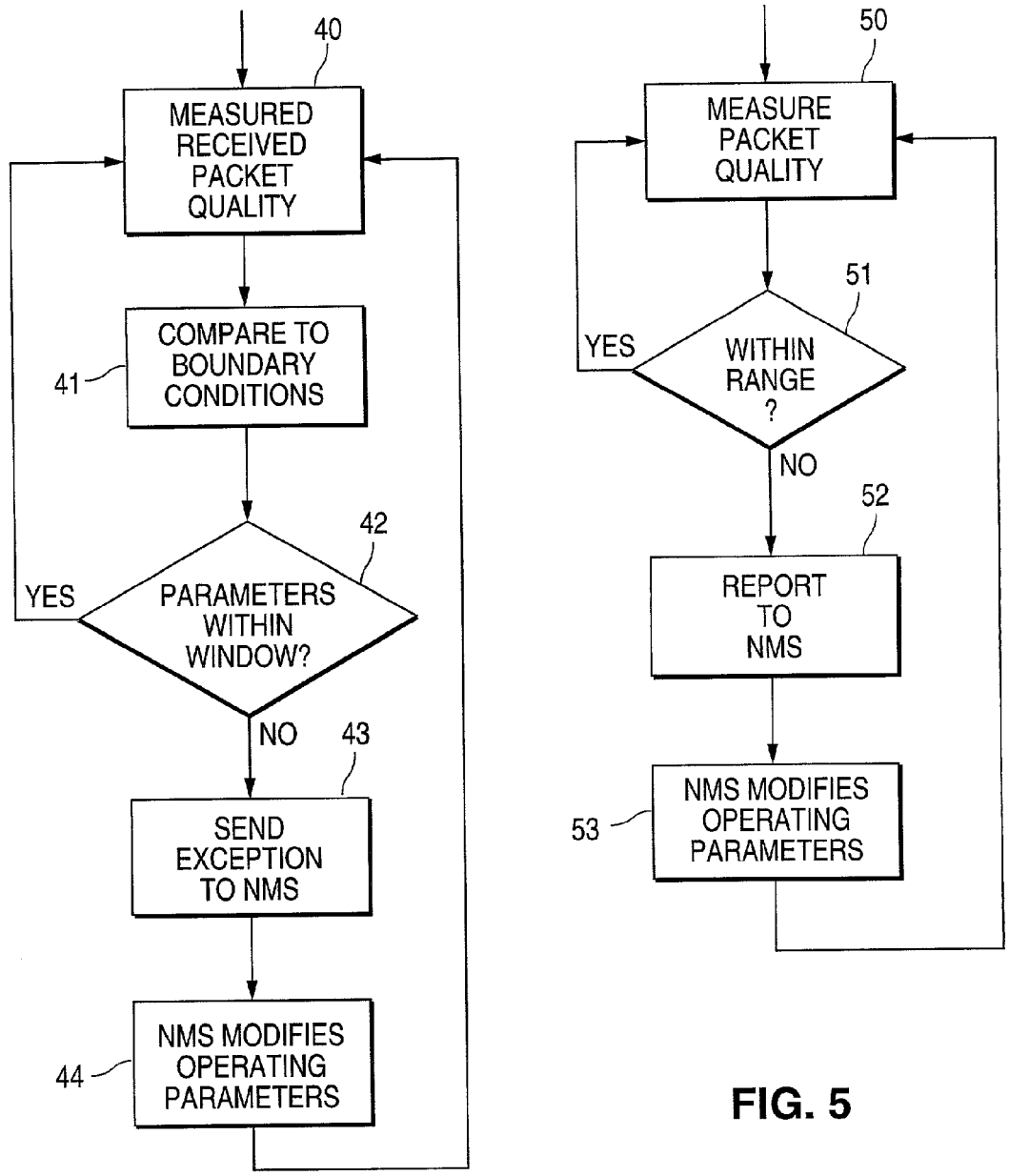
FIG. 4 is a flowchart of an embodiment of the downstream processing according to the present invention.
FIG. 5 is a flowchart of an embodiment of the upstream processing according to the present invention.

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method and system for distributed processing for optimal quality of service in a broadband access system. Any and all such modifications, equivalents and alternatives are intended to fall within the spirit and scope of the present invention.

In general, the present invention relates to the DOCSIS 1.0 (Data Over Cable Service Interface Specification) and DOCSIS 1.1 specifications promulgated by Cable Labs, the disclosures of which are herein incorporated by reference. Whereas the DOCSIS standards only address data over cable, the present invention also applies to wireless data transmission.

In a typical broadband access system, several parameters can be independently modified for both the upstream or downstream signals. These parameters include the modulation type, the symbol rate, the channel or sub-channel frequency, and the forward error correction (FEC) scheme and/or level of robustness. In practice, most system operators set these parameters for a perceived worst case scenario, and never bother to later modify the settings.

In general, the present invention distributes the QOS processing to the system modems and the head-end equipment. Requests for a change in the operating parameters are transmitted on an exception basis, thereby greatly reducing the amount of system over-head required.

Referring now to FIG. 5, in the upstream, the Cable Modem Termination System (CMTS) or Wireless Modem Termination System (WMTS or Wireless Hub) determines a signal-to-noise ratio (SNR), a Bit Error Rate (BER), or a Forward Error Correction (FEC) quality measurement, or similar measure, for each received packet (step 50). This information may be discarded if the data is between some predetermined, acceptable operating limits. However, if a measured parameter is outside of the predetermined lower limit for some averaged or weighted averaged for a series of packets (step 51), then the WMTS reports to the NMS (Network Management Operating System) the modem ID and the measured data of the particular packet or average (step 52). The NMS may then reassign the modem to a different downstream channel in the same (or overlapping) sector, which has a different operating frequency (useful for fading problems), a lower order modulation type (useful for SNR or multi-path problems), a lower symbol rate (useful for inter-symbol interference), a more robust FEC scheme, or some combination of these modifications (step 53).

The upstream demodulator may also report an exceptionally good received SNR or similar parameter or average. In this case, the NMS may choose to move the modem to a channel with a higher order modulation, a different type of modulation, a faster symbol rate, or a lower FEC factor, allowing higher data rates on the modem. The NMS may also choose to move the modem to a channel which has similar parameters but less traffic.

The downstream processing will now be described with reference to FIG. 4. In the downstream, each modem determines an SNR and FEC measurement for the incoming packets (step 40). These values may be compared to some boundary conditions (i.e. some predefined hysteresis window), which may be stored in a table (step 41). If a weighted average value is smaller than the lower limit then the modem sends an exception message to the NMS (step 43), which may reassign the modem to a different downstream channel (step 44). In some instances merely changing the frequency will solve the problem. In other cases, changes in the other operating parameters will be required. If the upper limit is exceeded, then the modem sends an exception signal offering to optionally move to a less utilized channel or one with higher net data rates. Since each modem is monitoring its own received downstream signal, the QOS processing is distributed, which greatly reduces the system over-head, as compared to various prior-art polling schemes. Also, to further reduce the over-head, lower boundary conditions could be sent with a high priority, whereas high boundary condition exceptions (i.e. upper limit exceeded) could be sent less frequently, and with a lower priority. The modem exceptions can be logged by the NMS for review by the system operator.

As part of the present dynamic scheme, various sets of predefined conditions may be established. For example, Channel A may operate at 64 QAM, 5 megasymbols, Channel B may operate at 64 QAM, 2 megasymbols, and Channel C may operate at 16 QAM, 5 megasymbols, creating a matrix of possible operating conditions. By changing channels, the operating parameters may be better for a particular modem, but by also changing the frequency, the propagation path may also have different characteristics. Thus, there is an inter-relationship between the frequency or sub-channel and the other operating parameters for a particular channel. Each modem may have a different optimum setting based upon all of the factors. A database of optimal settings can be maintained for each modem, including which settings are best for different times of day, weather conditions, etc. Alternatively, a weighted average could be calculated, giving priority to the most recent settings. The NMS can then use these settings when establishing communication with the modem.

The NMS may periodically review all channel assignments. If the NMS finds one channel or a group of channels that are serving only a few modems, these modems can be consolidated into one of the existing channels. This would free up spectrum for other channels to be created.

FIG. 1 and 3 illustrate different symbol and data rates for various channels. By changing the modulation type or symbol rate, one can get as much as a 20 dB improvement in performance, as shown in FIG. 2. Also, by changing the frequency for a given modem, its performance may also increase.

As described herein, the present invention adds additional functionality to each modem to allow the modem to determine predetermined downstream boundary conditions and report the state of the condition via an exception flag. The standard communication protocol may also need to be updated to support this extra exception field. By distributing the QOS processing, the present invention provides a greater level of system reliability, without significant additional over-head. In addition, the present invention can automatically compensate for poor conditions, and provide user connectivity, even under very poor conditions. Finally, the present invention also allows for system operators to receive system status reports by logging the exceptions. These exception reports can be used to pro-actively perform system maintenance, before a user even knows there is a problem.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for distributed upstream quality of service (QOS) processing in a broadband access system, the method comprising:

measuring a quality of received packets sent by a modem in an upstream channel at an upstream modem termination system;

determining whether the measured quality is within a predetermined range;

reporting an out-of-range quality for the received packets to a network management server; and modifying operating parameters for the upstream channel in accordance with the measured quality, if an out-of-range quality is reported;

wherein the out-of-range quality reported includes a measured quality above a high quality threshold and is reported at a different priority than measured qualities below a low quality threshold.

2. The method of claim 1, wherein measuring a quality of received packets comprises measuring a signal-to-noise ratio (SNR).

3. The method of claim 1, wherein measuring a quality of received packets comprises measuring a bit error rate (BER).

4. The method of claim 1, wherein measuring a quality of received packets comprises measuring a Forward Error Correction (FEC) quality measure.

5. The method of claim 1, wherein if the quality measure is below a predetermined lower limit for some averaged or weighted averaged value for a series of packets, then the modem ID and the measured quality data of a particular packet or average is reported to the network management server.

6. The method of claim 5, wherein the network management server reassigns the modem to a different downstream channel in the same or overlapping sector, which has a different operating frequency.

7. The method of claim 5, wherein the network management server reassigns the modem to a lower order modulation type.

8. The method of claim 5, wherein the network management server reassigns the modem to a lower symbol rate.

9. The method of claim 5, wherein the network management server reassigns the modem to a more robust Forward Error Correction scheme.

10. The method of claim 5, wherein the network management server reassigns the modem to a combination of a different frequency, a lower order modulation type, a lower symbol rate, and a more robust Forward Error Correction scheme.

11. The method of claim 1, wherein if the quality measure is above a predetermined upper limit for some averaged or weighted averaged value for a series of packets, then the modem ID and the measured quality data of a particular packet or average is reported to the network management server.

12. The method of claim 11, wherein the network management server reassigns the modem to a channel with a higher order modulation.

13. The method of claim 11, wherein the network management server reassigns the modem to a different type of modulation.

14. The method of claim 11, wherein the network management server reassigns the modem to a faster symbol rate.

15. The method of claim 11, wherein the network management server reassigns the modem to a lower Forward Error Correction scheme.

16. The method of claim 11, wherein the network management server reassigns the modem to a channel which has similar parameters but less traffic.

17. A method, for distributed downstream quality of service (QOS) processing in a broadband access system, the method comprising:

measuring a quality of received packets in a downstream channel at a modem;

comparing the measured quality with predetermined boundary conditions;

determining whether the measured quality is within the predetermined boundary conditions;

sending an exception to a network management server, if the measured quality is outside the boundary conditions; and modifying operating parameters for the downstream channel in accordance with the measured quality;

wherein if the measured quality is below a lower boundary condition, the exception is sent with a high priority, and if the measured quality is above a high boundary condition, the exception is sent with a lower priority.

18. The method of claim 17, wherein if the measured quality is below a lower limit, the network management server reassign the modem to a different downstream channel.

19. The method of claim 17, wherein if the measured quality exceeds an upper limit, then the modem sends an exception signal offering to move to a less utilized channel.

20. The method of claim 17, wherein if the measured quality exceeds an upper limit, then the modem sends an exception signal offering to move to a channel with a higher net data rate.

21. The method according to claim 17, wherein the method is performed in a broadband wireless access system.

22. A method for distributed processing for optimal quality of service (QOS) in a broadband access system, the method comprising:

a method for distributed upstream quality of service (QOS) processing, the method comprising:

measuring a quality of received packets sent by a modem in an upstream channel at an upstream modem termination system;

determining whether the measured quality is within a predetermined range;

reporting an out-of-range quality for the received packets to a network management server; and modifying operating parameters for the upstream channel in accordance with the measured quality, if an out-of-range quality is reported; and a method for distributed downstream quality of service (QOS) processing, the method comprising:

measuring a quality of received packets in a downstream channel at a modem;

comparing the measured quality with predetermined boundary conditions;

determining whether the measured quality is within the predetermined boundary conditions;

sending an exception to a network management server, if the measured quality is outside the boundary conditions; and modifying operating parameters for the downstream channel in accordance with the measured quality;

wherein:

the exception is sent, at a first priority if the measured quality is below and outside the boundary conditions, and at a second priority if the measured quality is above and outside the boundary conditions; and the first priority is higher than the second priority.

23. The method according to claim 22, wherein the method is performed in a broadband wireless access system.

24. The method according to claim 1, wherein the method is performed in a broadband wireless access system.

* * * * *